United States Patent [19]

Delacou

[11] Patent Number: 4,709,280

[45] Date of Patent: Nov. 24, 1987

[54] APPARATUS FOR VARYING THE PATH OF MAGNETIC TAPE PASSING OVER A ROTARY TAPE HEAD

[75] Inventor: Jean Michel Delacou, Rueil-Malmaison, France

[73] Assignee: Enertec, Montrouge, France

[21] Appl. No.: 782,801

[22] Filed: Oct. 2, 1985

[30] Foreign Application Priority Data

Oct. 8, 1984 [FR] France ................................ 84 15407

[51] Int. Cl.[4] ...................... G11B 5/584; G11B 15/20; G11B 15/61
[52] U.S. Cl. ........................................ 360/85; 360/70; 360/84
[58] Field of Search ...................... 360/84, 85, 70, 77

[56] References Cited

U.S. PATENT DOCUMENTS

| | | | |
|---|---|---|---|
| 3,512,694 | 5/1970 | Sugaya et al. | 226/91 |
| 3,691,315 | 12/1972 | Ellmore | 360/95 |
| 3,697,676 | 10/1972 | Protas | 360/70 |
| 3,943,566 | 3/1976 | Brock et al. | 360/71 |
| 3,968,517 | 7/1976 | Chimura et al. | 360/10.2 |
| 4,035,842 | 7/1977 | Terao et al. | 360/10 |
| 4,167,023 | 9/1979 | Bessett et al. | 358/127 |
| 4,275,424 | 6/1981 | Maxey | 360/85 |
| 4,282,552 | 8/1981 | Tachi et al. | 360/70 |

FOREIGN PATENT DOCUMENTS

| | | |
|---|---|---|
| 0115275 | 8/1984 | European Pat. Off. . |
| 0115776 | 8/1984 | European Pat. Off. . |
| 1537240 | 10/1969 | Fed. Rep. of Germany . |
| 1255363 | 1/1961 | France . |
| 2350663 | 12/1977 | France . |
| 2350661 | 12/1977 | France . |
| 2373853 | 7/1978 | France . |

OTHER PUBLICATIONS

IBM Technical Disclosure Bulletin, vol. 17, No. 4 (p. 1188).
IBM Technical Disclosure Bulletin, vol. 18, No. 12 (pp. 3931–3934).

Primary Examiner—Robert S. Tupper
Attorney, Agent, or Firm—Dale Gaudier

[57] ABSTRACT

Apparatus for recording and reading information on a magnetic tape, comprising heads rotating in the median plane of a drum (38) against which the tape can pass over a helical path (11). Means are provided for modifying the pitch of the helical path (11) of the tape, such as two movable rollers (55, 56) disposed respectively downstream and upstream of the drum (38), separated by a fixed difference in height and adapted to move in such a manner as to vary the length of the portion of tape connecting them without varying said difference in height.

13 Claims, 13 Drawing Figures

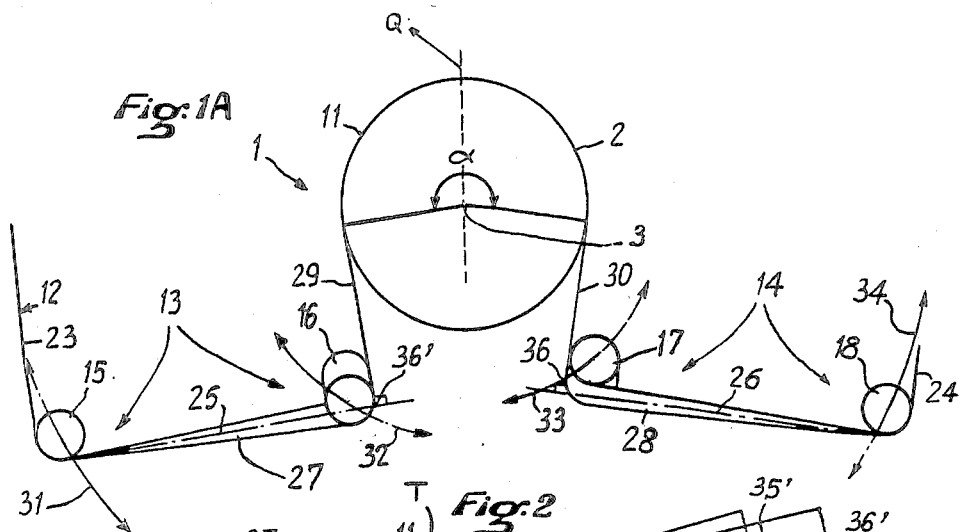
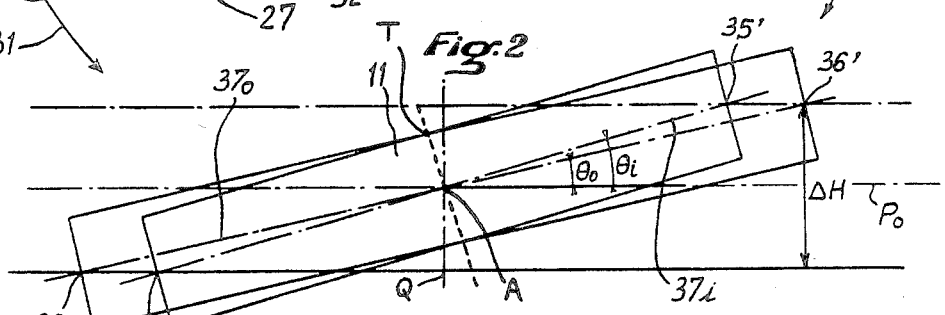
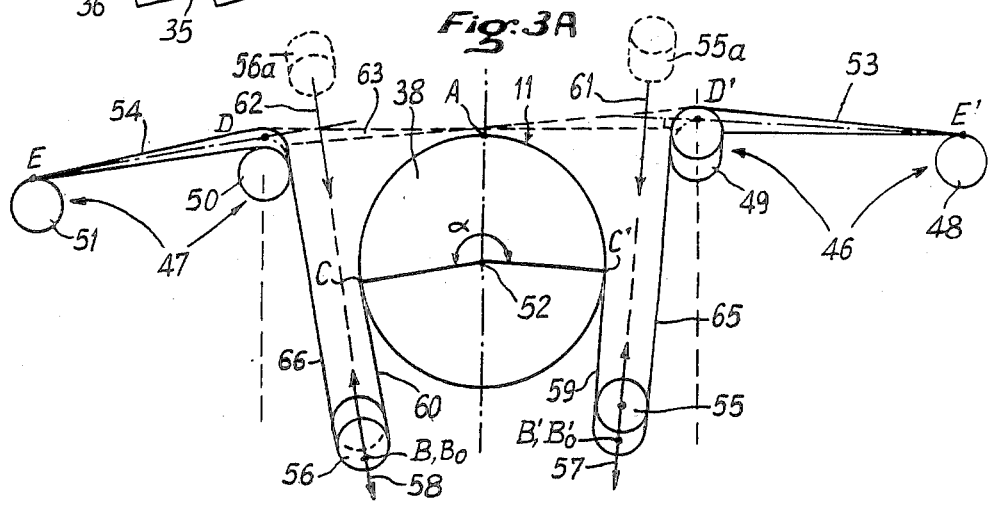
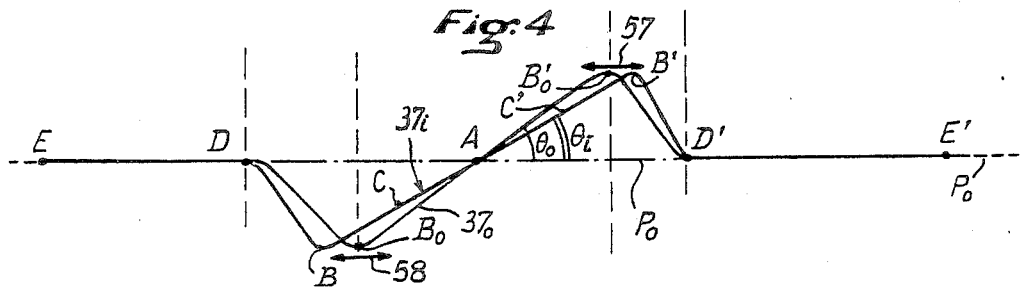

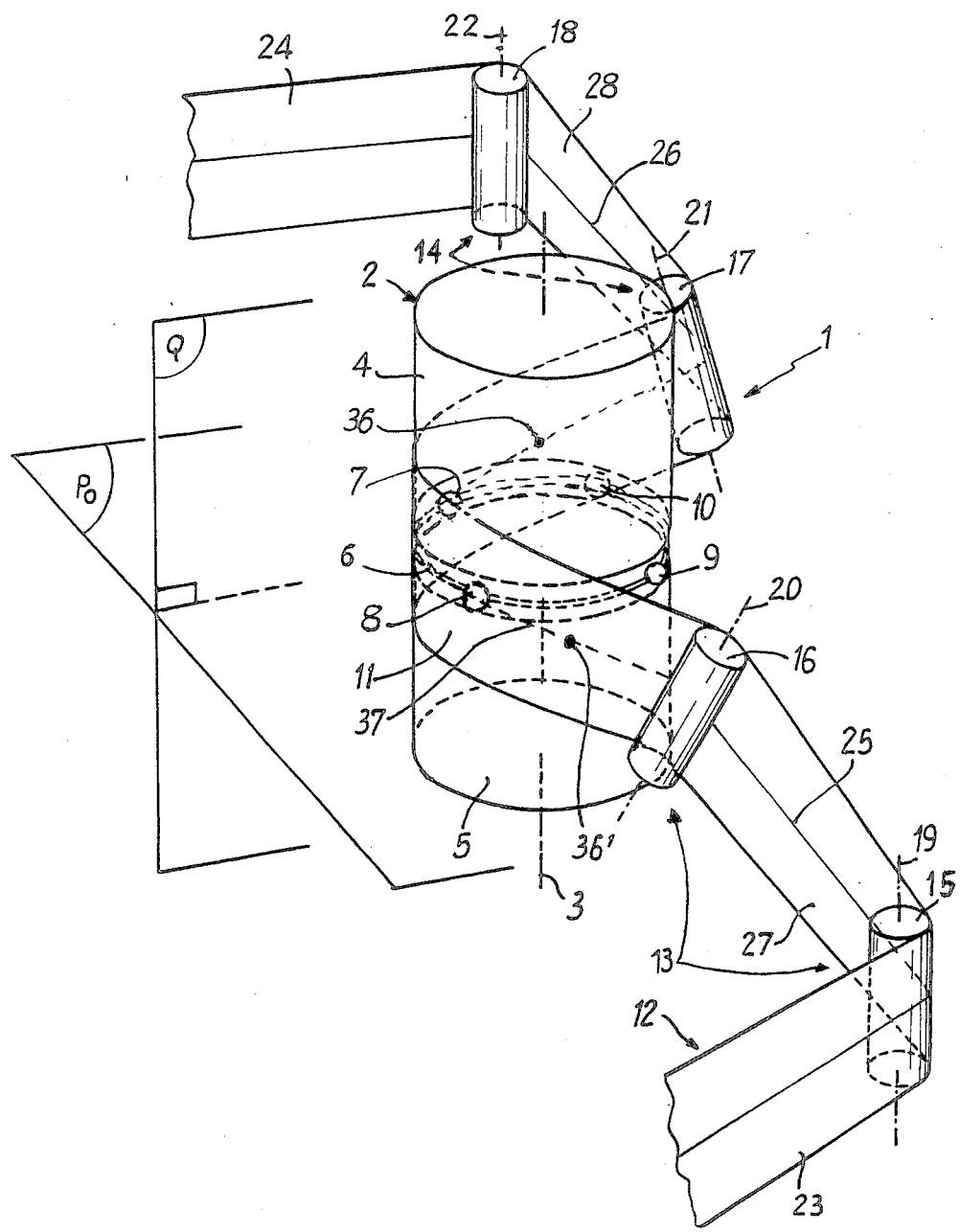

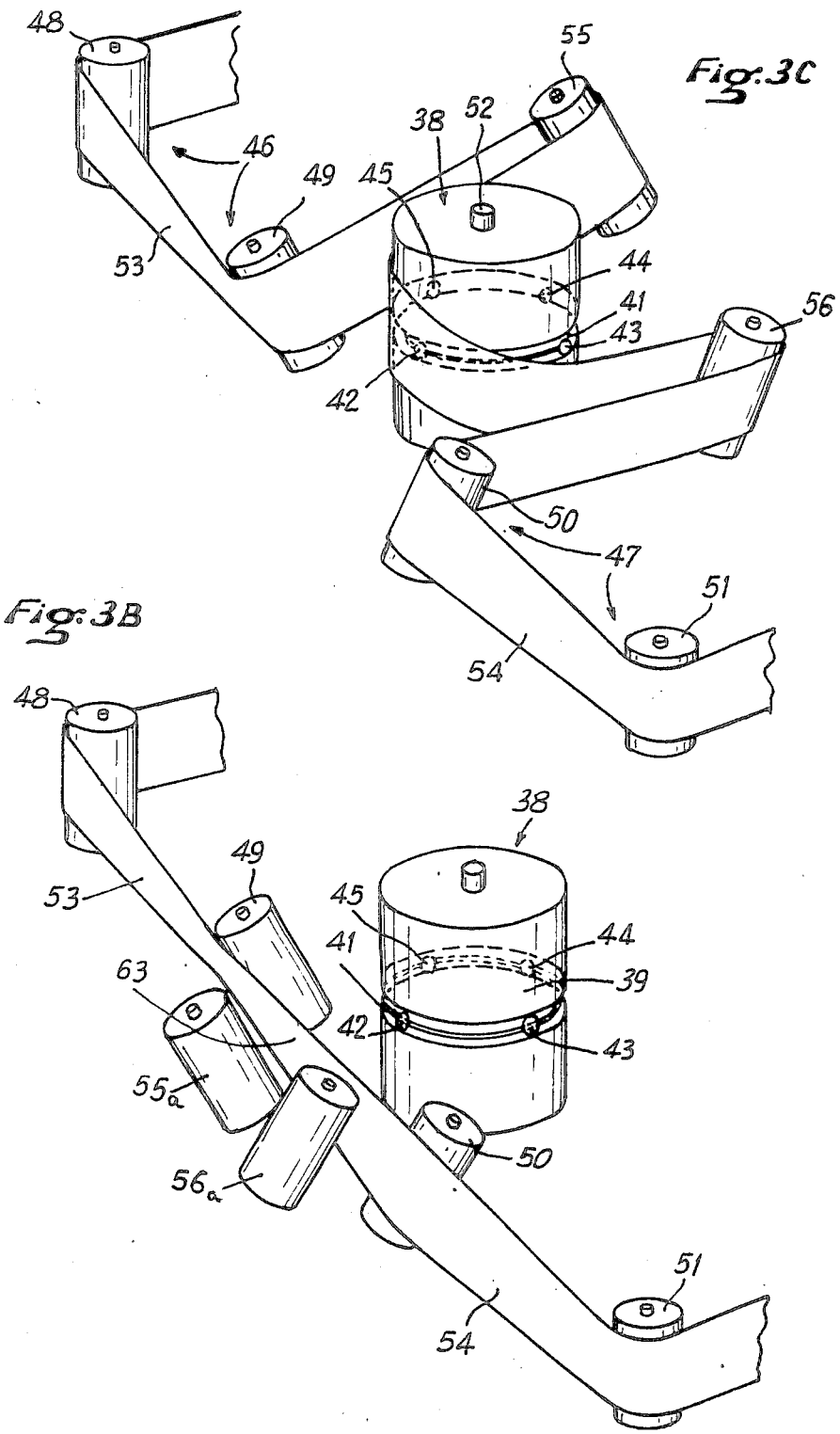

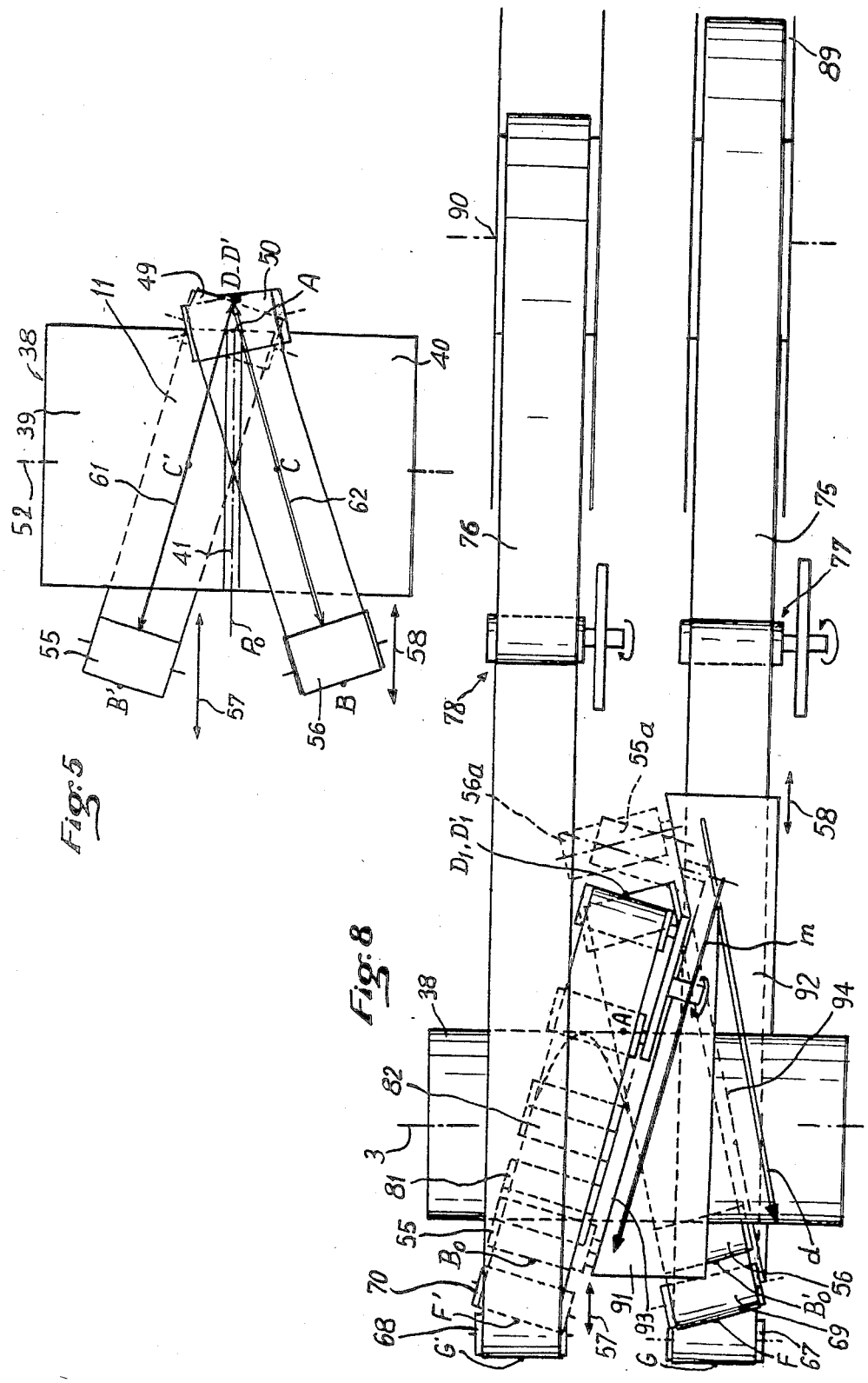

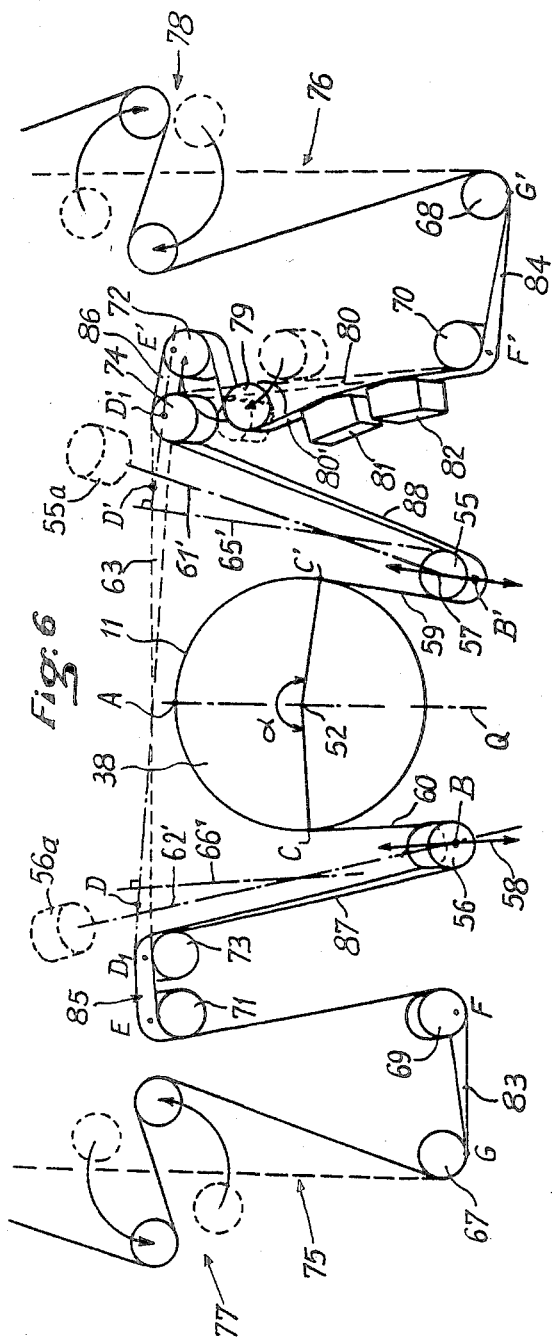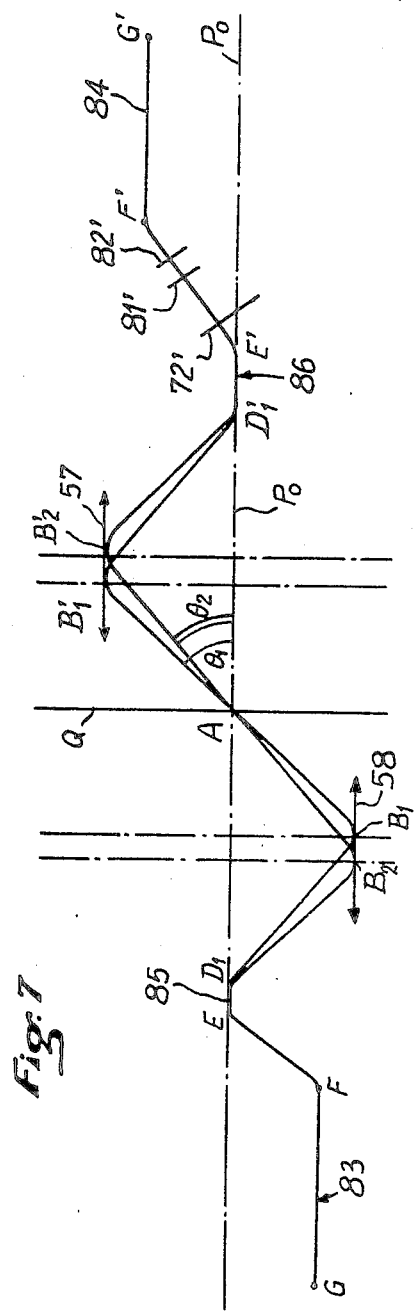
Fig. 6
Fig. 7

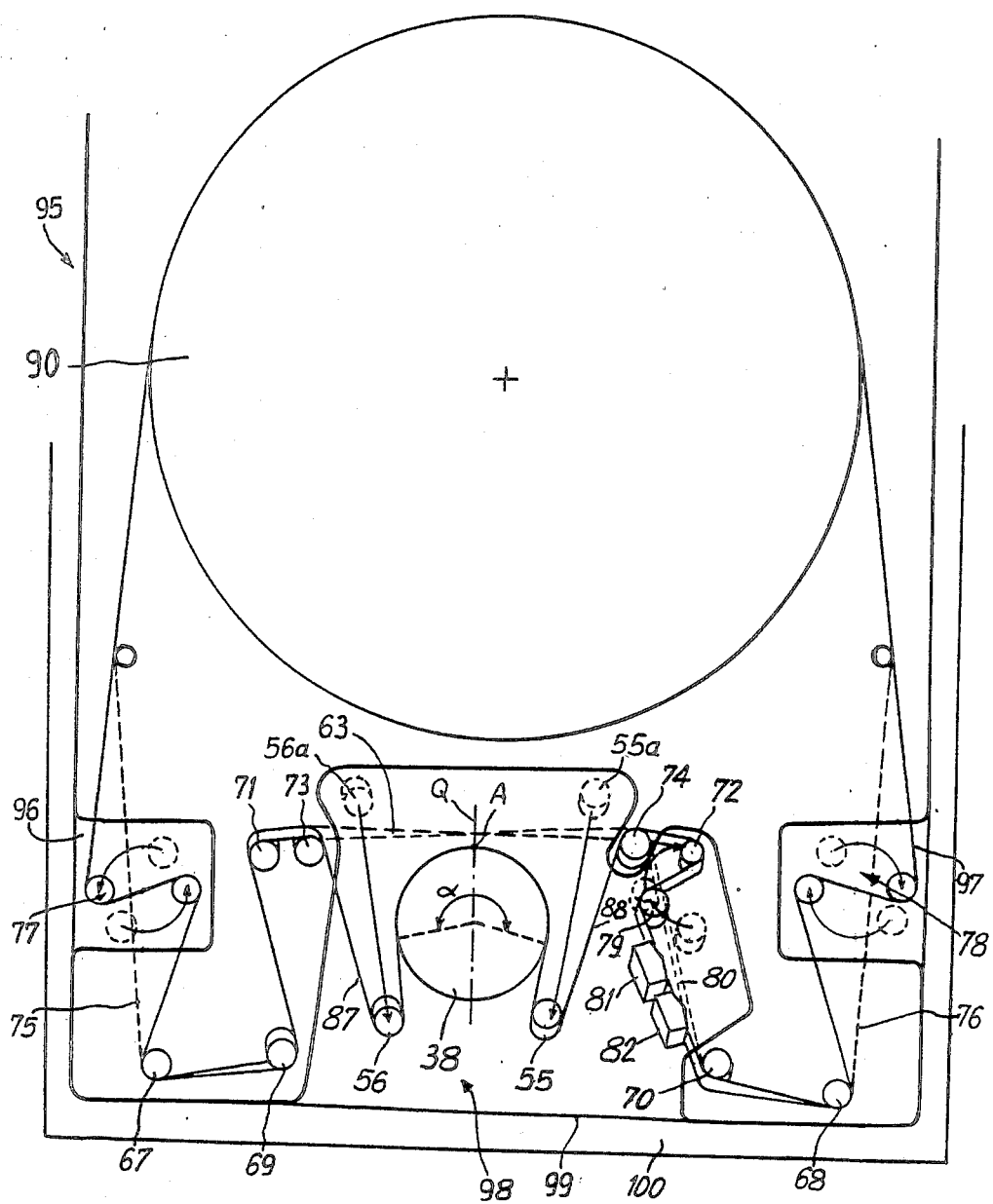

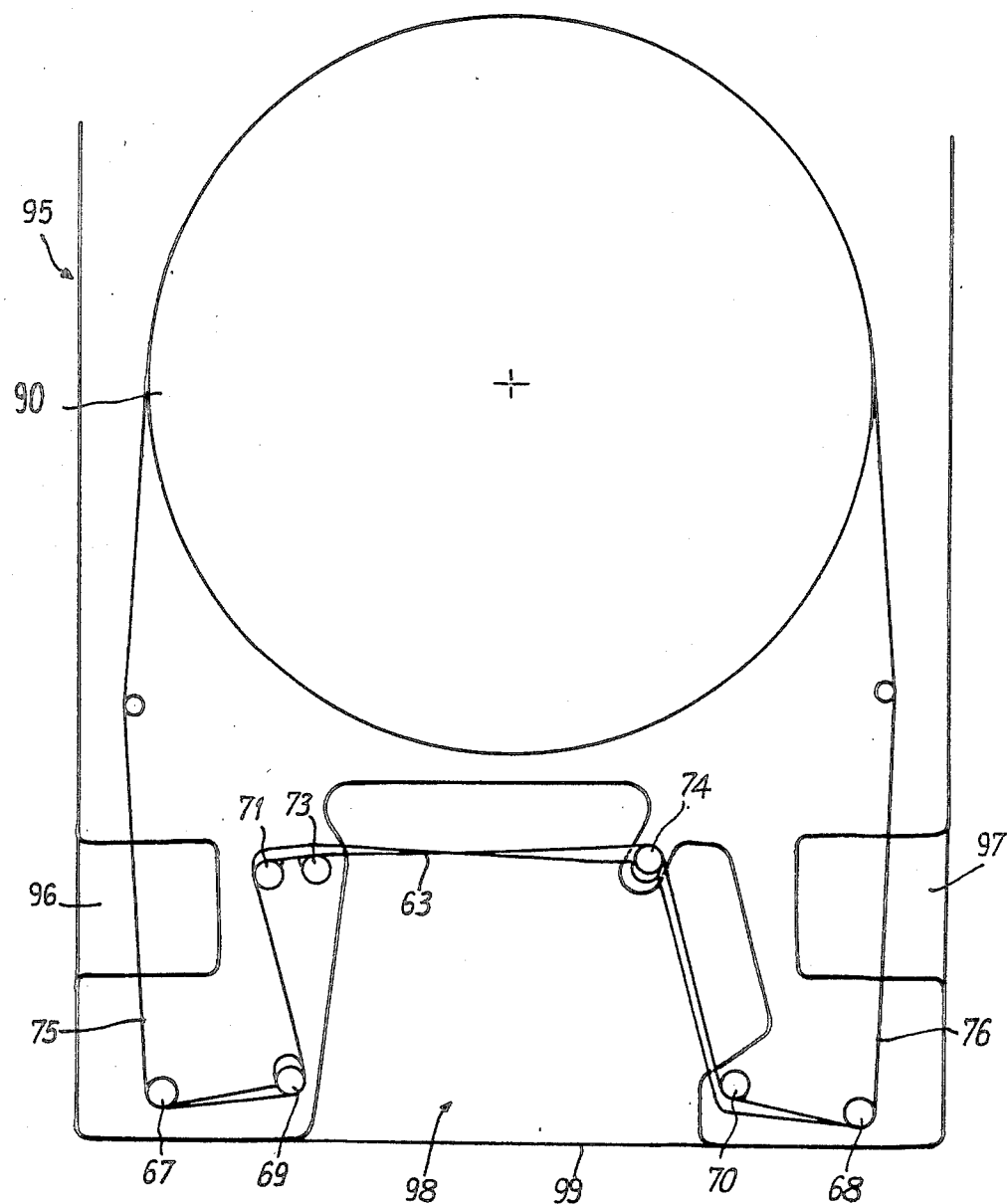

APPARATUS FOR VARYING THE PATH OF MAGNETIC TAPE PASSING OVER A ROTARY TAPE HEAD

TECHNICAL FIELD

The present invention relates to an apparatus for recording and reading information on a tape, for example a magnetic tape.

It deals more particularly with an apparatus of the type comprising a drum composed of an upper cylinder and a lower cylinder, which are coaxial and fixed and between which is disposed a coaxial rotary disc of the same diameter, which carries on its periphery at least one record and read head. A magnetic tape is able to be moved (at a speed substantially lower than that of the head) over the drum and the annular surface of the rotary disc, along a helicoidal path whose length (in the longitudinal direction) and pitch (that is to say its inclination relative to the axis of the drum) are given, by means of twist rollers disposed near the drum and respectively downstream and upstream of the latter, in relation to the direction of movement of the tape.

BACKGROUND ART

It has been known for a long time to record and read data on a magnetic tape by means of an apparatus having a rotating head.

It is known that information recorded with the aid of apparatus of this kind is carried on the tape along linear segments or on tracks, of which some are longitudinal (reserved for example for recording audible signals and/or synchronization marks) and others are oblique relative to the longitudinal axis of the of the tape and receive the data or information recorded for the purpose of subsequent processing.

Likewise in known manner, the use of multitrack recorders enables the throughput of information recorded or read on the tape to be increased in proportion to the number of tracks.

Nevertheless, there are limitations to the information throughput which can be achieved, in particular because of the difficulties of the processing in real time of the information read back on the tape.

In certain applications, for example, digital information representing physical paramaters and coming from a plurality of sensors is recorded in real time at a high rate. This information is intended to be read back subsequently and processed in deferred time by a computer.

If the information read rate cannot be modified relative to the information record rate, the latter cannot then exceed the maximum value of the rate acceptable to the computer effecting the processing of the information read back from the tape, which is bothersome when the number of data to be recorded in real time per unit of time is high.

In other cases it may be that the computer has to work under conditions in which its minimum acceptable rate is higher than the information record rate.

It is then desirable to be able to vary, in the highest possible proportions, the ratio of information read and record rates.

Two parameters must be maintained between recording and reading, namely on the one hand the trajectory of the head relative to the tape, so as to read back the information at the exact point where it was recorded, and on the other hand the relative speed of the head and the tape, which cannot be modified by more than a few hundredths in relative value without leading to distorsions of the signal.

However, since the speed of the heads is much higher than the speed of the tape, the speed of the latter can be modified in order to obtain a variation of the information rate, without entailing an unacceptable variation of the relative speed of the head in relation to the tape.

Means are already known for making it possible with the aid of a rotary head to read back information on a magnetic tape whose speed may assume two different values. In particular, means of this kind are provided in video recorders which permit picture freeze and in which the heads can scan either the successive tracks of the moving magnetic tape or a single track of the motionless tape.

In order to compensate for the variation of inclination of the trajectory of the heads in relation to the tape, which occurs when the tape speed passes from its nominal value to zero value or vice versa, in these known devices the trajectory of the heads is corrected in such a manner that the heads continue to follow the track or tracks corresponding to the information recorded.

Nevertheless, in these known devices the correction is of low amplitude and, as is shown for example in U.S. Pat. No. 4 410 918, can be effected with the aid of a piezoelectric bimetallic strip which at all times controls the position of each head.

However, a solution of this kind entails the use of sliding contacts whose operation is delicate and whose reliability is only moderate, and the use of which becomes expensive and complicated when there are a large number of heads. Moreover, this solution can be applied easily only when the correction of trajectory is of low amplitude.

DISCLOSURE OF INVENTION

In this context, the present invention seeks to provide a device which in a simple manner enables the direction of the trajectory of the head relative to the tape to be kept constant whatever the speed given to the latter within a wide range of values. To this end, according to the invention the apparatus comprises means for modifying the pitch of the helicoidal path of the tape in dependence on the speed of the latter, in such a manner that the trajectory of the head relative to the tape has a constant direction independent of the speed of the tape.

In particular, it thus becomes possible, by equipping a rotary-head recorder with means for varying the speed of the tape substantially proportionally to a desired information rate and with means for utilizing only a number of heads proportional to this desired rate, to obtain very different information rates for recording and reading.

An application of this kind can be illustrated by the following example:

Considering a recorder provided with 32 rotary heads, if the recording is made with these 32 heads, with a head speed of 40 m/s and a tape speed of 1 m/s, and if the information recorded is read back with a single head at a head speed of 40 m/s and a tape speed of 3.125 cm/s, the ratio of the rates mentioned above, which is equal to the ratio of the tape speeds, attains a a value of 32.

In one advantageous embodiment the means for modifying the pitch of the helicoidal path comprise at least one roller movable along a so-called deflection path and disposed upstream or downstream of the drum in relation to the direction of movement of the tape The means for modifying the pitch of the helicoidal tape path comprise for example two movable rollers disposed respectively upstream and downstream of the drum and separated by a given difference in height, the pitch of the helicoidal path being modified by a movement, along a deflection path, of at least one of the movable rollers which effects a variation of the length of the portion of tape included between these rollers and passing over the drum, without substantial variation of said difference in height.

The resulting precision in the variation of the pitch of the helicoidal path is much greater than if the roller were moved vertically; this is particularly advantageous because of the slight variations of the pitch of the helical path which have to be achieved, which are of the order of 0.5° and because of the usual width of a track, which is close to 40 microns.

The two movable rollers preferably move in such a manner that the projections of their deflection trajectories onto the plane of rotation of the heads will be symmetrical in relation to the bisector plane of the projection, onto the plane of that head, of the angle at the center of the helicoidal path.

Thus the position of the center point, in the longitudinal direction of the median or neutral axis of the helicoidal path is not modified, at least in a direction transversal to the bisector plane.

In order to obtain minimum dimensions, the two movable rollers move along their deflection path in respective planes lying symmetrically on each side of the plane of rotation of the heads and parallel to said plane, in the directions of the projections onto these planes of the portions of tape tangent both to the drum and to these respective movable rollers.

This double condition concerning the deflection path of each movable roller (symmetry in relation to bisector plane and parallelism to the plane of rotation of the heads) makes it possible to keep said center point of the helicoidal path invariable in space when the deflections of the movable rollers occur, thus enabling a synchronization head to be placed in position opposite the edge of the tape and vertically in line with said center point.

The apparatus of the invention, defined by the characteristics indicated above, is particularly suitable for rapid loading of the tape onto the drum.

In the prior art the tape is loaded either manually, which the resulting risk of breaking of the tape, or with the aid of complicated means.

This is all the more troublesome because apparatuses of th kind described above are in most cases intended, at least during data acquisition, for use "in the field" and difficult environmental conditions, and have to be handled by persons who do not always have either the time or the necessary means for the loading operation to be carried out without damage to the tape.

The present invention remedies this situation and relates to an apparatus adapted to permit easy and rapid loading of the tape onto the drum, this apparatus being of the type comprising at least two twist rollers disposed respectively one on each side of the drum and beyond each roller which is movable relative to the drum.

To this end, the movable rollers intended for varying the pitch of the helicoidal path also serve as loading means, and for that purpose are each mounted for movement along a loading path between a position of rest situated, relative to the drum, beyond the portion of tape joining the twist rollers on each side of the drum, and a middle working position situated in the plane containing the deflection path of the corresponding movable roller, the loading paths of the movable rollers having an inclined general direction and being travelled over, from the position of rest to the working position, in a direction which is respectively upward for one roller and downward for the other, and these movable rollers having axes substantially at right angles to their loading path.

These characteristics permit the use of cassettes of a simple design under conditions of advantageous reliability and without danger to the tape, and perfectly suitable in particular for the working conditions usually encountered in the field. In addition, loading is effected with the aid of a limited number of rollers and without any risk of breaking the tape.

In order that the deflection of the movable rollers may not affect the twist of the tape, the movable rollers intended for loading and for modifying the pitch, on the one hand, and the two twist rollers immediately adjoining these movable rollers, on the other hand, are preferably rollers having floating axles which, because of their inclinability, permit the balancing of the tension forces of the tape which they support. It is in fact known that rollers having floating axles, which are known per se, can oscillate about any axis which is at right angles to their longitudinal axis and passes through the center of the latter.

In one embodiment of the invention, the projection of each of the loading paths of the two movable rollers, which are intended for modifying the pitch and for loading, onto the plane of rotation of the head is substantially transversal to the portion of free tape which, in the position of rest of the movable rollers, joins the twist rollers disposed on each side of the drum.

The apparatus comprises for example two assemblies of twist rollers disposed on each side of the drum and beyond the corresponding movable roller, in relation to the drum, each of these assemblies comprising a first roller relatively distant from the drum and having a fixed axle parallel to the axis of the drum and a second roller relatively near the drum and having an axle oscillating about its center, the direction of the portion of tape connecting the two twist rollers in its twisting travel being, for each assembly, at least approximately orthogonal to the portion of tape tangent to the drum in the loaded position of the tape.

In a more complete modified embodiment, each assembly of rollers comprises in adition third and fourth twist rollers having axes substantially parallel to that of the corresponding movable roller and disposed between the second twist roller and this movable roller, defining a twist path secondary in relation to the main twist path defined by the first and second twist rollers, the respective principal and secondary twist paths of each twist assembly being orthogonal to the portion of tape tangent to the drum, and the neutral axes of the portions of tape connecting the third and fourth secondary twist rollers being contained in the plane of rotation of the heads.

The invention is applicable to an apparatus in which the magnetic tape is wound on two non-coplanar storage reels, to each of which a twist assembly corresponds, the neutral axis of the portion of tape connecting together the two main twist rollers of each assembly being disposed in the median plane of the corresponding storage reel, and the neutral axis of the portion of tape connecting together the two secondary twist rollers of each twist assembly being disposed in the plane of rotation of the heads.

The invention also relates to an assembly for the recording and reading of information stored on a support in the form of a tape, for example a magnetic tape, wound on a set of storage reels disposed in a container forming a cassette associated with the abovedescribed apparatus according to the invention, as well as to a cassette and a tape deck forming said assembly.

BRIEF DESCRIPTION OF DRAWINGS

Other features and advantages of the invention will emerge from the following description, given by way of indication and not having a limitative character, with reference to the accompanying drawings, in which:

FIGS. 1A and 1B constitute FIG. 1 and show, respectively in plan view and in perspective, a first example of construction of an apparatus according to the invention.

FIG. 2 shows diagrammatically the change of inclination of the helicoidal tape path bearing against the drum.

FIGS. 3A, 3B, 3C constitute FIG. 3 and show, in plan view in the first case and in perspective in the other two cases, a drum, the loading rollers, and the twist rollers of a second example of construction of an apparatus provided with loading means according to the invention.

FIG. 4 is a diagram, in a vertical plane, of the heights of the neutral axis of the tape at different points on its travel along the apparatus shown in FIG. 3A.

FIG. 5 is a diagrammatical view from the left of the apparatus shown in FIG. 3A.

FIG. 6 is a diagrammatical top plan view of a modified form of construction of the apparatus according to the invention.

FIG. 7 is a diagram in a vertical plane of the heights of the neutral axis of the tape in its path along the apparatus shown in FIG. 6.

FIG. 8 is a side view in elevation of an apparatus corresponding to the diagram in FIG. 6.

FIG. 9 shows a view from above of a cassette containing two coaxial reels loaded on a tape deck.

FIG. 10 is a view from above of the cassette of FIG. 9, shown by itself.

BEST MODES FOR CARRYING OUT THE INVENTION

FIG. 1 shows diagrammatically a first example of an apparatus according to the invention.

The apparatus 1 comprises record and read means consisting of a cylindrical drum 2 having the axis 3 (vertical in this particular case) and composed in known Manner of an upper cylinoer 4 and a lower cylinder 5, which are coaxial and fixed and between which is placed a rotary disc 6 provided with at least one magnetic record and read head (hereinafter referred to by the word "head"), which is known per se. The disc preferably has a plurality of heads, for example four heads 7 to 10 disposed at 90° from one another, in the plane Po of the rotary disc orthogonal to the axis 3 of the drum 2. The plane Po corresponds to the expression "plane of rotation of the heads" employed above. In cases where there are a plurality of heads offset on the same generatrix of the rotary disc, the plane Po is then considered to be the median plane equidistant from the heads.

This example of arrangement of the heads on the rotary disc 6 is such that each head is operative over half a rotation of the disc.

The apparatus contains means (not shown but known per se) for varying the speed of passage of the tape and means (likewise known but not shown) for operating one or more heads.

These means are operated in such a manner that the ratio of the number of heads in service for the recording of information to the number of heads in service for reading the information is equal to the ratio of the speed of passage of the tape for recording to the speed of passage of the tape for reading, that is to say also equal to the ratio of the information rate for recording to the information rate for reading.

The number of heads in service (for recording and for reading) being a whole number, the ratio of the tape speeds for recording and for reading is expressed by a rational number.

A magnetic tape 12 forming the support for information which is to be recorded and read is adapted to move against the surface of the drum over a helicoidal path 11, in such a manner as to bear against the annular surface of the disc 6. The tape 12 is driven in this movement by means known per se, which are not shown in FIG. 1 for reasons of clarity.

Twist assemblies 13, 24 permit the passage of the tape 12 from an upstream storage reel to a downstream storage reel (these reels not being shown), and also the correct relative positioning of the tape 12 and drum 2.

These twist assemblies are situated one on each side of the drum 2 and in the example shown in FIG. 1 are each composed of a pair of twist rollers 15, 16 and 17, 18 respectively. Each pair comprises a first twist roller 15, 18 having its axis 19, 22 parallel to the axis 3 of the drum 2, and a second twist roller 16, 17 having an inclined axis 20, 21 and variable inclination, these second twist rollers twisting the portion of tape joining them and enabling the tape 12 to be wrapped around the drum 2 over a helical path 11 of given pitch, corresponding to an angle of inclination (as shown in FIG. 2, in which the surface of the drum is developed flat) and in accordance with a given wraparound angle (FIG. 1A) projected onto a plane parallel to the plane Po.

The axes 20 and 21 of the second twist rollers 16, 17 are inclined in relation to the axis 3 of the drum in directions respectively perpendicular to the tangents drawn at the ends of the helical path 11 defined on the drum 2.

The twist rollers 15, 16 and 17, 18 respectively are disposed in different horizontal planes equidistant from the horizontal plane Po of the rotary disc carrying the heads, and parallel to the plane Po.

If the expression "bisector plane" is applied to the plane Q at right angles to the plane Po and passing through the bisector of the angle at the center of the helical path, the tape path on each side of the drum is (projected onto the plane Po) symmetrical relative to the bisector plane Q, and the point A, which is central in the longitudinal direction of the neutral axis 37 of the helical path 11, is both in the plane Po and in said bisector plane Q (FIG. 2).

The examples of embodiment described below and illustrated in the drawings will be considered as complying with this condition.

Thus, the axes 20, 21 of the second rollers 16, 17 of each twist assembly are inclined in relation to the axis 3 of the drum 2 by angles of the same value equal to the angle of inclination of the helical path.

In order that the tape portions 23, 24 joining each storage reel to the corresponding twist assembly 13, 14 will be in the plane of the corresponding reel, while ensuring correct twist between the two twist rollers of each assembly, the median or neutral axes 25, 26 of the tape portions 27, 28 connecting the two rollers 15, 16 and 17, 18 of each pair of twist rollers are respectively orthogonal to each neutral axis 36', 36 of the tape portion 29, 30 tangent both to the drum 2 and to the corresponding second twist roller 16, 17.

The general means making it possible to modify the pitch of the helical path 11 have been mentioned previously.

FIGS. 1 to 8 and the description relating to them concern examples of construction of the apparatus according to the invention in which the modification of the pitch of the helical path 11 is achieved by the displacement, along deflection paths, of at least two movable rollers disposed respectively upstream and downstream of the drum and separated by a given difference in height, which bring about a variation of the length of the portion of tape lying between these two movable rollers and passing over the drum, without entailing any (substantial) variation of said difference in height.

It is clearly understood that the invention is in no way limited to this type of apparatus, but on the contrary includes any variants, particularly in connection with the number of movable rollers and their deflection path.

Two examples of the apparatus belonging to the type mentioned above and permitting modification of the pitch of the helical path 11, that is to say the angle $\theta$, will be described below, one with reference to FIG. 1 and the other with reference to FIGS. 3 to 10.

According to the first example described below, referring to FIG. 1, the apparatus effects the modification of the pitch, that is to say of the angle $\theta$, by varying the wrap-around of the helical path 11, without however modifying the "useful" height H of the drum, which has been defined above (FIG. 2).

For this purpose, the apparatus comprises two pairs of movable rollers (identical with the twist rollers 15 to 18 in the example shown in FIG. 1) adapted to move along deflection paths in the form of circular arcs, designated respectively 31, 32, 33, 34 (FIG. 1A).

In order to permit the movement of the movable rollers, the base of the axle of each of the latter is, for example, mounted on a slide adapted to be driven in a translatory movement (by a cable, worm or the like connected to a motor) along a rail having the shape of an arc of a circle centered on the axis of the drum.

When this is done, the wrap-around of the helical path 11, and therefore the length of this path, is modified (FIG. 2).

Insofar as the circular arc-shaped deflection paths 31 to 34 of each of the four movable rollers are respectively disposed in a plane parallel to the plane Po, that is to say a horizontal plane, it is necessary to provide for a change of inclination of the axis 20, 21 of the second movable rollers 16, 17. Thus, a constant height H (FIG. 2) is maintained between the points 35 and 35', 36 and 36' of the neutral axis 37i, 37o of the entire helical path situated between the rollers 16 and 17, while modifying the pitch, that is to say the angle made by the neutral axis 37 of the helical path 11 with the horizontal, which thus passes from $\theta_o$ (middle position 37$_o$) to $\theta_i$ (modified position 37$_i$).

The modification of the inclination of the axis 20, 21 of the second rollers 16, 17 (the nearest to the drum) can be effected without additional regulation or intervention, because of the so-called "floating" mounting of these rollers. This known mounting consists in allowing the roller to pivot about its centre; the position of equilibrium of the axis during the movement of the tape is then determined by the value and direction of the tension forces of the tape.

Thus, when the tape changes its inclination on the drum as it passes along, the axis of the movable rollers 16, 17 is inclined in such a manner that it is always orthogonal to the neutral axis of the portion of tape tangent to said roller. The appearance of a vertical tangential component of the internal tension force in the tape, which would tend to cause the tape to slip relative to the roller.

It should be noted that in the particular example shown in FIG. 1, which has just been described, the movable rollers permitting through their deflection the modification of the pitch of the helical path, are identical with the twist rollers and that in addition this modification of the pitch does not entail variation of the wrap-around of the helical path 11

The second example proposed according to the invention for the modification of the pitch of the helical path is described with reference to FIGS. 3 to 10, and first of all with reference to FIGS. 3A to 3C which show a simplified form of construction of the apparatus according to the invention.

This apparatus comprises a cylindrical drum 38 consisting of an upper cylinder 39 and a lower cylinder 40, which are coaxial and between which is placed a central rotary disc 41 provided on its periphery with a plurality of heads 42 to 45, disposed 90° from one another (FIGS. 3B and 3C).

The apparatus comprises in addition two twist assemblies 46, 47 situated one on each side of the drum 38 and each consisting of a pair of rollers 48, 49 and and 50, 51 respectively, namely a first roller 48, 51 whose axis is parallel to the axis 52 of the drum 38, and a second roller 49, 50 whose axis is inclined in order to twist the portion of tape 53, 54 connecting together the two twist rollers of the same pair. The inclinations of the axes of the twist rollers 49, 50, like those of the twist rollers of the first example described above and relating to FIGS. 1A and 1B, are equal to the angle of inclination of the helical path 11.

The neutral axis of each of these twisted portions of tape 53, 54 is situated in the plane Po which, according to the hypothesis mentioned previously, passes through A, the center point of the neutral axis 37 of the helical path 11 wrapped around the drum, as can be seen in the diagram in FIG. 4.

According to this second embodiment, the apparatus comprises two movable rollers 55, 56 (separate from the twist rollers in contrast to the first example shown in FIG. 1), which are disposed respectively upstream and downstream of the drum 38 and in the immediate proximity of the latter, precisely between the drum and each twist assembly 46, 47. The movable rollers 55, 56 are disposed one on each side of the plane Po, in a middle working position, for each of which positions the desired, peviously mentioned conditions of winding (winding angle and middle inclination angle $\theta_o$) are obtained.

According to this second example of embodiment, the rollers 55, 56 are likewise movable about their middle working position (represented by the points Bo and B'o the exact significance of which will be given further on), along the deflection path, as indicated in FIGS. 3A and 4 by the double arrows 57, 58 in order to permit modification of the pitch of the helical path 11.

These deflections take place in planes parallel to Po and equidistant from the latter, and they are parallel to the respective projections, onto the plane Po, of the tape portions 59, 60 tangent both to the drum 38 and to the corresponding movable roller 55, 56. These deflections are symmetrical in relation to the bisector plane Q.

The centre point A thus remains fixed in space during the deflections, because the latter are symmetrical and are contained in planes parallel to the plane Po.

The point A thus constitutes the point fixed in space around which the helical tape path 11, bearing against the drum, pivots on the modification of the pitch of the path in relation to the drum.

This arrangement makes it possible to place (see FIG. 2) on the drum, for example on the upper cylinder, a fixed synchronization head T associated with a longitudinal track placed in a top position on the tape and intended for synchronizing the speed of the heads with the position of the successive inclined tracks carrying information. This fixed synchronization head T is placed on the drum, on the one hand, opposite the corresponding longitudinal track, and on the other hand on the line perpendicular to the neutral axis 37 of the tape passing through A. The variations of inclination of the tape on the drum, that is to say the variations of the pitch of the helical path, affect only to a negligible extent the relative positioning of the fixed synchronization head and of the associated longitudinal track, since the point on the tape corresponding to the head is placed on the line perpendicular to the center of rotation of the tape.

In a modified version of the second example of embodiment, illustrated in FIG. 3, only one of the rollers 55 or 56 could be movable along a deflection path, the other roller remaining fixed in its middle working position.

Nevertheless, both the movable rollers 55, 56 will be considered to be adapted to undergo deflections symmetrical in relation to the bisector plane Q.

Thus, when these deflections are made about the middle working position of each of the movable rollers 55, 56, the inclination of the helical path 11 is modified, and this is done while maintaining a constant wrap-around of this path, equal to 188° in the example described.

This variation of the angle of inclination of the tape on the drum gives rise to a secondary twisting of the tape, which is added to the main twisting introduced by the fixed twist rollers 48 to 51.

It is therefore necessary to untwist the tape and in addition to maintain the orthogonality between the axis of the fixed twist rollers and the neutral axis of the portion of tape ending at the roller (in order to avoid the appearance of a vertical force on the tape which would tend to cause the latter to slip upwards or downwards on the roller).

To this end the movable rollers 55, 56 on the one hand, and the fixed second twist rollers 49, 50, on the other hand, are mounted on floating axles oscillating about the centre of the roller.

In the particular example shown in FIG. 3, the twist assemblies composed of pairs of rollers 48, 49 and 50, 51 are intended both for the main twist (which permits herlical wrapping around the drum) and for the secondary twist (as the result of the deflections of the movable rollers 55, 56 about their rspective working position).

In FIGS. 3 to 5 the points B and B' are defined as being the points of intersection of, on the one hand, the neutral axis of the portion of tape bearing against the movable roller 55, 56 and, on the other hand, of the direction of the corresponding deflection path 57, 58 about the middle working position, passing through the centre of the movable roller.

In addition, the points Bo and B'o are defined as being the points in space, and therefore independent of the position of the tape, corresponding to the points B and B' for the middle working position of each of the movable rollers 55, 56.

Thus, for this middle working position of the movable rollers 55, 56 the points B and Bo, and B' and B'o are respectively identical.

In FIGS. 3A and 4 the points C and C', D and D', E and E' are defined as being the points on the neutral axis of the tape tangent to the drum or to the corresponding roller.

More precisely, the points C and C' are the tangential points on the tape at the point where the tape moves away from the drum. The points D and D' correspond to the points on the neutral axis of the twisted portion of tape 53, 54 where this portion is tangent to the corresponding twist roller 50, 49 having an inclined axis and comes into contact with that roller.

Similarly, the points E and E' are the points on the neutral axis of the twisted tape portion 53, 54 where this portion comes into contact with the first corresponding twist roller 51, 48.

In the particular example of FIG. 3A, the twisted tape portions 53, 54, that is to say DE and D'E', connecting the fixed twist rollers 48, 49 and 50, 51 of each pair together, have their neutral axis orthogonal to the respective tape portions 59, 60 tangent at C' and C to the drum and ending at the corresponding movable roller 55, 56.

It should be noted that this arrangement is not obligatory and does not in any way limit the invention. The respective orthogonality between the twisted tape portions D'E' and DE, on the one hand, and the tape portions 59, 60 on the other hand simply provides the advantage of disposing the neutral axis of each twisted tape portion 53, 54 in a given horizontal plane (parallel to the plane Po) corresponding to the plane of the storage reel.

The inclinations, relative to the horizontal, of the tape portions DB and BC, on the one hand, and D'B' and B'C', on the other hand, are identical and both are equal to the angle of inclination of the helical path 11 on the drum, and the points Bo and B'o corresponding to the middle working position of each of the movable rollers are equidistant from Po.

Since the projections of the lengths of the portions DB and D'B' onto the plane Q are equal to those of AB and AB', the points D and D' can therefore be considered as fixed in space. The fixed twist rollers 50, 49 oscillate about their centres in such a manner as to take up the secondary twist of the tape resulting from the deflections of the movable rollers 55, 56 about their middle working position.

On the deflection of the movable rollers 55, 56, the points C snd C' remain on the same straight line parallel to the axis 3 of the drum 38, because the wrap-around of the helical path 11 bearing on the drum is not changed.

On the deflection of the movable rollers about their middle working position, the points B and B' must remain on planes parallel to the plane Po in order to keep the point A fixed in space.

The inclination of the axes of the movable rollers 55, 56 varies, as mentioned previously, in order to take up the secondary twist due to the deflections of these rollers.

The path of the base of each movable roller must therefore in theory be different from tne rectilinear horizontal path desired for the points B and B'.

It can be shown that the base of the axis of each movable roller 55, 56 must (if it is desired to keep B and B' in horizontal planes) move, not along a straight line contained in a plane parallel to the plane Po, but along a curve contained in a plane parallel to the axis of the drum and represented by a relatively complex set of trigonometrical functions, in which the following intervene the radius of the movable roller,
half the width of the tape,
the middle angle of inclination, and
the modified angle of inclination.

However, taking into account the values of the parameters encountered in practice (the variation of is of the order of 0.5°), the value of y varies at most by only 0.2 micron in relation to the corresponding horizontal plane parallel to the plane Po.

It can therefore be considered, as a very close approximation, that the base of the axis of each of the movable rollers 55, 56 moves in a plane parallel to the plane Po when deflections 57, 58 are made about the working position, the respective planes containing the rollers 55 and 56 being equidistant from the plane Po.

It is apparent that the apparatus according to the invention permits modification of the pitch of the helical path 11 in an easy manner with the aid of only a small number of rollers movable along simple deflection paths.

According to the invention, moreover, the apparatus contains tape loading means enabling the tape to be positioned on the drum along a helical path.

To this end, the movable rollers 55, 56 also constitute loading rollers and for that purpose are mounted for translatory movement and can be moved by the action of displacement means (not shown but explained further on in the description relating to FIG. 8) between a position of rest 55a and 56a (shown in broken lines in FIG. 3A), in which the tape is withdrawn from these movable rollers and from the drum 38 and directly connects together the fixed second twist rollers 49 and 50 along the twisted path 63 (corresponding to FIG. 3B), and a middle working position (shown in solid lines in FIG. 3A), in which the tape bears against the drum along the helical patn 11 (corresponding to FIG. 3C).

The movable loading (and pitch modification) rollers 55, 56 are adapted to move along respective loading paths 61, 62 situated one on each side of the drum 38, along an inclined direction, one of them downwardly (roller 56) and the other upwardly (roller 55) to the middle working position corresponding to the middle inclination $P_0$ of the tape on the drum (FIG. 5).

The terms "downwardly" and "upwardly" are defined as follows: a given direction is selected on the vertical axis 52 of the drum 38 and will be called "upward" or "downward" for respective movements towards the top or the bottom. The loading path of the movable rollers is called downward (or upward) depending on the direction of the path of its projection onto the vertical axis 52 of the drum 38.

Each of the loading paths 61, 62 is more precisely constituted by a segment of a straight line passing through Bo (or B'o respectively) and contained in the inclined plane defined by the points D, Bo, C (or D', B'o, C' respectively) and parallel, in the case of FIG. 3, to the tape portion 60 (or 59 respectively) tangent to the drum and to the corresponding movable roller.

Thus, only two rollers are required for loading the tape onto the drum, and this loading is effected rapidly and safely without danger to the tape, while ensuring correct positioning of the tape on the drum.

The example shown in FIG. 3 is a special case in the sense that, on the one hand, each loading path 62, 61 is disposed in a same vertical plane as the direction of the deflections 57, 58 of the movable rollers (and therefore parallel to the tape portion 59, 60 tangent to the drum), and that, on the other hand, each inclined tape portion 65 and 66 respectively joining the fixed inclined twist roller 49, 50 and the movable roller 55, 56 is parallel to each of the free tape portions 59, 60 tangent to the drum at C' and C. Each loading path 61, 62 (by hypothesis parallel to the tape portions 59, 60) is then also parallel to the inclined tape portions 65, 66.

The embodiment described above and relating to FIGS. 3 to 5 is suitable for an apparatus associated with a cassette containing coplanar storage reels Another form of construction of the apparatus according to the invention is illustrated in FIGS. 6 and 8 and is applied more particularly, although not obligatorily, to the case where the cassette has noncoplanar storage reels, for example coaxial reels Members shown in FIGS. 6 and 8 which are similar to those shown in FIGS. 3 and 5 are given the same references.

The apparatus comprises two twist assemblies disposed one on each side of the drum, each consisting of a first pair intended for the main twist, namely a first roller 67 and 68 respectively, having its axis parallel to the axis 52 of the drum 38, and a second roller 69 and 70 respectively, having an inclined axis to permit the main twisting of the tape, and a second pair intended for the secondary twisting, namely a third roller 71 and 72 respectively, having a fixed inclined axis, and a fourth roller 73 and 74 respectively having a floatingly mounted inclined oscillating axis.

The embodiment shown in FIG. 6 comprises the following additional members.

On the path of the tape portions 75, 76 ending at the coaxial storage reels (not shown) are provided respective tension detectors 77, 78, each mounted on a turntable and comprising two rollers, between which the tape passes.

Similarly, one of the twist assemblies (the one on the right in the example shown in FIG. 6) comprises a turntable on which are fixed the first secondary twist roller 72 and a deflecting roller 79. Near the tape portion 80 connecting the secondary twist rollers 72, 74 and the main twist roller 70 are disposed auxiliary read means 81, 82 known per se and adapted to be associated with the longitudinal tracks disposed on the tape, against which read means this tape can be applied by the movable roller 79 moved from its position of rest to a working position by the rotation of the turntable supporting it.

The points A, B, B', C and C' are the homologues of those shown in FIG. 3.

The points F, G and F', G' correspond to the tangential points of the neutral axis of the tape portion 83, 84 connecting the corresponding fixed main twist rollers 67, 69 and 68, 70, while the points D1, E and D1', E' correspond to the tangential points of the neutral axis of the tape portion 85, 86 connecting the corresponding secondary twist rollers 71, 73 and 72, 74 together in pairs.

The points D and D' in space, each corresponding to the point of the neutral axis of the tape portion 85, 86 tangent to a fictitious roller which is the homologue respectively of the rollers 50, 49 in FIG. 3A, that is to say are positioned in such a manner that the neutral axis of the imaginary tape portion 66', 65' connecting the aforesaid fictitious roller to the corresponding movable roller will be orthogonal to DE and D'E' respectively.

In relation to the embodiment shown in FIG. 3 the second rollers 73, 74 of each of the secondary twist pairs are angularly offset away from the drum; in other words, the points D and D' have been moved to D1 and D'1.

In addition, the tape portion 87, 88 connecting the secondary twist roller 73 (and 74 respectively) and the movable roller 56 (and 55 respectively) is not parallel to the respective tape portions 60, 59.

This arrangment makes it possible to facilitate the loading of the tape onto the drum 38 on movement of the movable rollers 55, 56 along their loading path 61', 62'.

In order that the change of position, relative to the embodiment shown in FIG. 3, of the points D and D' to D1 and D'1 will not affect the fundamental geometry of the apparatus, it is necessary that D1 (D'1) should be situated in the plane Po.

In a modified version of the example relating to FIG. 6, the secondary twist rollers 73 and 74 could be mounted for movement along the straight line DE, or D'E' respectively, in such a manner that the points D1 and D'1 are displaceable. However, in the remainder of the description the rollers 73 and 74 will be considered to be fixed.

The arrangement of the fixed twist rollers and of the movable rollers in a vertical plane is illustatd in FIG. 7, where the helical tape path 11 has two different inclinations 1, 2 for two different positions $B'_1$, $B_1$ and $B'_2$, $B_2$ of each of the movable rollers 55, 56 along their respective deflection direction 57, 58.

The segments FG and F'G' are parallel to the segments D1E and D'1E' respectively, and the inclined segment EF (E'F') has a length such that FG (and F'G') will be contained in the median plane of the corresponding reel. The length EF (and E'F') may be variable to permit adaptation to the variations of height of reels, independently of the "useful" tape height H on the drum, which was defined previously (FIG. 2).

The points E, D1, F, G are in the inclined plane DBoC in the example shown in FIGS. 6 and 8, Bo corresponding to the middle working position of the movable roller 56.

The scale of the lengths and angles is approximate in the diagrammatical representation in FIG. 6. Thus, for example, the lengths FG and F'G' are in reality longer; similarly, the inclination $\beta$ of FG and D1E relative to a horizontal line tangent to the drum at A has been exaggerated in FIG. 6, whereas in reality its value is $\beta = \alpha - 180°$, that is to say for $\alpha = 188°$ $\beta = 4°$.

In FIG. 7 the references 81' and 82' indicate the position of the working zones of the auxiliary read heads 81, 82. The axis 72' represents the axis of the secondary twist roller 72 which is mounted on a turntable and which may be in the form of a capstan associated with a motor for driving the tape.

FIG. 8 shows a side view of the apparatus shown in FIG. 6; the parallel tape portions 75 and 76 here come from coaxial storage reels 89, 90.

The apparatus comprises two inclined slopes 91, 92 whose inclined face 93, 94 constitutes the loading path of each of the movable rollers 55, 56 in the loading direction indicated by the arrows m and d, that is to say upward for the roller 55 and downward for the roller 56.

The loading paths, that is to say the inclined faces 93, 94 of the slopes are parallel to the planes DABo and D'AB'o.

Referring to FIGS. 6, 7 and 8, the apparatus operates in the following manner.

In the starting position the tape follows the path shown in broken lines in FIG. 6 (tape portions 75, 63, 80 and 76).

The turntables of the tension detectors 77 and 78 then pivot and the tape portions 75, 76 thereupon follow the paths shown in solid lines (FIG. 6).

The turntable of the roller-capstan 72 and of the deflection roller 79 then pivots in turn, thus applying the tape portion 80' against the auxiliary heads 81, 82, this tape portion then following the path 80' shown in solid lines (FIG. 6).

During this time the movable rollers 55 and 56 are still in the position of rest 55a, 56a.

This position, in which the tape is withdrawn from the drum (the tape not being "loaded"), makes it possible to move the tape at high speed, for example for the purpose of searching for a given sequence of information on the tape with the aid of the auxiliary heads 81 and 82, such as information carried on a longitudinal sound track or a longitudinal track carrying time or synchronization information.

The loading of the tape onto the drum is effected by the movement of the movable rollers 55, 56 along the inclined faces of the ramps 91, 92 in the direction of the arrows m, d in FIG. 8 to the middle working position corresponding to each point Bo, B'o under the action of displacement means, such as a cable fixed for example to the base of the corresponding movable roller. Once the movable roller is in the working position, it is locked in that position on the ramp by means of a detachable locking means fastened to the latter.

The movement of the tape, and also the recording or reading of information carried on the tape with the aid of the rotating heads 42 to 45, can then start.

Depending on the desired information rate, an inclination is selected for the helical path 11 of the tape around the drum.

Any change of the inclination of this path is effected by the deflection movement of the ramps, on which the movable rollers 55, 56 are positioned, in deflection directions 57, 58 parallel to the plane Po and to the projection onto this plane of the tape portions 59, 60 tangent to the drum and to the movable rollers 55, 56.

The ramps are displaced with the aid of slides fixed on each of them and adapted to be moved along rails (suitably oirected as described above) by means of a stepping motor or by means of a worm and ball drive connected to a motor.

When this is done, the inclination of the axes of the movable rollers 55, 56 and of the rollers 73, 74 of each secondary twist pair is modified in order to maintain orthogonality between the axes of the rollers and the neutral axis of the tape, and in order to correct the secondary twist introduced by this change of inclination of the tape on the drum. The modification of the inclination of the axes of the movable rollers is effected by means of the so-called floating mounting of these rollers, as mentioned previously.

It will be noted that the pairs of rollers 71, 73 and 72, 74 of each twist assembly are intended for the secondary twisting consequent on the change of inclination of the helical tape path on the drum, while the pairs of rollers 67, 69 and 68, 70 are reserved for the main twisting of the tape, which is independent of the loading and of the variation of the inclination of the helical path, and therefore independent of the movement of the movable rollers 55, 56.

The invention also relates to a record and read assembly composed of a deck and a cassette, of which one example of construction is shown in a top plan view in FIG. 9, while the cassette alone is shown in FIG. 10.

The cassette 95 comprises a casing in which are mounted the two coaxial tape storage reels 89, 90 and the two twist assemblies, namely the main twist assembly 67, 69 and 68, 70 and the secondary twist assembly 71, 73 and 74.

The casing of the cassette 95 has side through holes 96, 97 for the passage of tape tension detectors 7, 78, and a front aperture 98 intended for the passage of the free tape portion 63 directly joining the two twist assemblies.

The front aperture 98 (closed by a front wall 99) also permits, in the working position on the associated deck 100, the passage of the drum and the displacement of the assembly of movable rollers disposed on the deck.

The deck 100 comprises the drum 38, the movable rollers 55, 56 and their loading ramps 91, 92, the turntable carrying the roller-capstan 72 and the deflection roller 79, the auxiliary read heads 81, 82, the two tape tension detectors 77, 78, and also the means of driving the movable rollers along their inclined loading paths, on the one hand, and along their horizontal deflection paths, on the other hand.

Thus, a rigid and therefore strong cassette is obtained, which is relatively leaktight and able to be easily loaded from above onto the deck, the tape being already twisted and ready to be loaded onto the drum 38 by the displacement of the movable rollers 55, 56 along their loading paths, without requiring additional space.

I claim:

1. Apparatus for recording and reading information of the type having a rotary head, means for moving a magnetic tape along a helical path over the rotary head, the head comprised of a drum on the periphery and in a secant plane of which at least one record and read head moves circularly, and means for maintaining the speed of rotation of the head during normal operation at a speed substantially higher than the speed of movement of the tape, the improvement comprising: two rollers disposed respectively upstream and downstream of the drum, and means for modifying the pitch of the helical path of the tape in dependence on the speed of the tape wherein at least one of said rollers is movable, and wherein said rollers are separated by a difference in height which is substantially constant and which is not zero, said means for modifying including means for moving each movable roller along a deflection path wherein the length of the tape portion lying between these rollers and passing over the drum and therefore the pitch of the helical path of the tape over the drum is varied without substantial variation of said difference in height between the rollers.

2. Apparatus according to claim 1, wherein both the rollers are movable and wherein said means for moving said rollers moves said rollers so that the projections of their deflection paths onto the plane of rotation of the head are symmetrical relative to a plane which bisects the projection onto the plane of this head of the angle at the center of the helical path.

3. Apparatus according to claim 1 wherein both the rollers are movable and said means for moving the rollers in respective planes symmetrically disposed one on each side of the plane of rotation of the head and parallel to said plane, in the directions of the paths, in these planes, of tape portions tangent both to the drum and to the respective movable rollers.

4. Apparatus according to claim 3, further comprising at least two pairs of twist rollers disposed respectively on each side of the drum, beyond each movable roller in relation to the drum, wherein the movable rollers also include means for loading the tape and each of said movable rollers is mounted for movement along a loading path between a position of rest situated, relative to the drum, beyond a free tape portion joining the twist rollers on each side of the drum, and a middle working position situated in a plane parallel to the plane of rotation of the rotary head each of the loading paths of the movable rollers being inclined with respect to the plane of rotation of the rotary head.

5. Apparatus according to claim 4, wherein each of the loading paths of the two movable rollers is substantially transverse to the free tape portion.

6. Apparatus according to claim 4 further comprising two assemblies of twist rollers disposed one on each side of the drum and beyond a corresponding movable roller in relation to the drum, each twist assembly comprising a first roller relatively distant from the drum and having a fixed axis parallel to that of the drum, and a second roller having an inclined axis oscillating about its center, the direction of a twisted tape portion connecting pairs of twist rollers in each assembly being at least approximately orthogonal to the tape portion tangent to the drum and to a corresponding movable roller when the tape is in a loaded position.

7. Apparatus according to claim 6, wherein each twist assembly comprises two pairs of twist rollers, a first being disposed of a first fixed roller and a second fixed roller, the axes of these rollers being respectively parallel and inclined in relation to the axis of the drum and these rollers defining a main twist path, and a second pair composed of a third roller having a fixed inclined axis and a fourth roller having an inclined oscillating axis, said second pair defining a secondary twist path being responsive to the deflection movements of the movable rollers for modification of the pitch of the tape relative to the rotary head, the pairs of twist rollers being disposed in such a manner that the main twist path and secondary twist path are parallel to one another for each twist assembly, the longitudinal axes of the tape portions connecting the two secondary twist rollers being contained in the plane of rotation of the head.

8. Apparatus according to claim 7, wherein the longitudinal axes of the tape portions for each twist assembly connecting together the main twist rollers and the secondary twist rollers are orthogonal to the longitudinal axis of a tape portion tangent both to the drum and to the movable roller.

9. Apparatus according to claim 7, wherein the magnetic tape is wound on two storage reels which are not coplanar, the two main twist rollers being disposed in such a manner that the longitudinal axis of the tape portion connecting these two rollers together is disposed in the median horizontal plane of the corresponding storage reel, and the secondary twist rollers being disposed such that the longitudinal axis connecting them in pairs is disposed in the plane of rotation of the head.

10. Apparatus according to claim 4 including means for displacing the movable rollers comprising an inclined ramp coupled to each roller, each ramp defining a respectively rising loading path and descending loading path which connect the position of rest and the middle working position of the corresponding movable roller, each ramp further being mounted for translatory movement over a deflection path parallel to the horizontal projection of the tape portion tangent to the drum and to the movable roller, whereby the movable rollers may be displaced so as to modify the pitch of the helical tape path on the drum.

11. Apparatus according to claim 1, of the type for recording and reading information on a tape wound on a set of storage reels disposed in a cassette, comprising a fixed deck on which said cassette is removably placed in position, said deck including said cylindrical drum having at least one rotary read and record head, two rollers between a position of rest and a middle working position, and about their middle working position, a drive capstan for driving the tape when the cassette is in position on said deck, said twist roller assemblies being disposed respectively downstream and upstream of the drum and mounted on the cassette, and wherein cutouts are further provided in order to enable passage of the movable rollers and the drum which are mounted on said deck and the displacement of the movable rollers between their position of rest and their working position when the cassette is in position on said deck.

12. Apparatus according to claim 11, wherein the deck further includes tape tension detectors mounted on turntables turning between a position of the rest and operative position, and wherein cutouts are provided in the cassette to permit the passage of these detectors in their position of rest and their movement to their operative position.

13. Apparatus according to claim 1 and further including means for controlling the tape speed in proportion to a desired information rate and means for bringing into service a plurality of rotary heads proportional to this rate, whereby information is read and recorded in accordance with different rates, the ratio of said rates being defined by a rational number.

* * * * *